Figure 1:
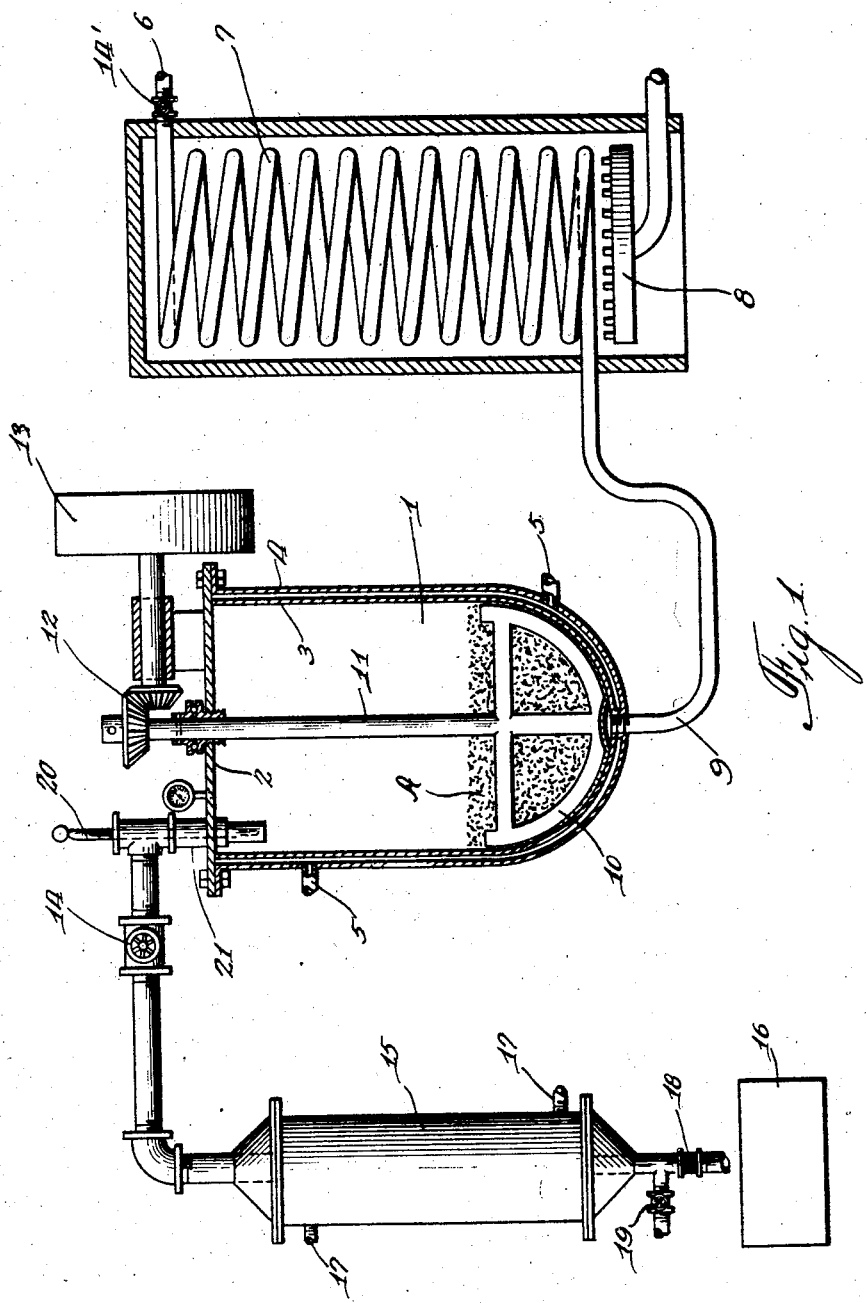

Dec. 20, 1938.   H. J. BROWNLEE   2,140,572
PROCESS FOR PRODUCING FURFURAL
Filed June 24, 1936    2 Sheets-Sheet 1

Inventor:
Harold J. Brownlee
By Jones, Addington, Ames & Seibold
Attys.

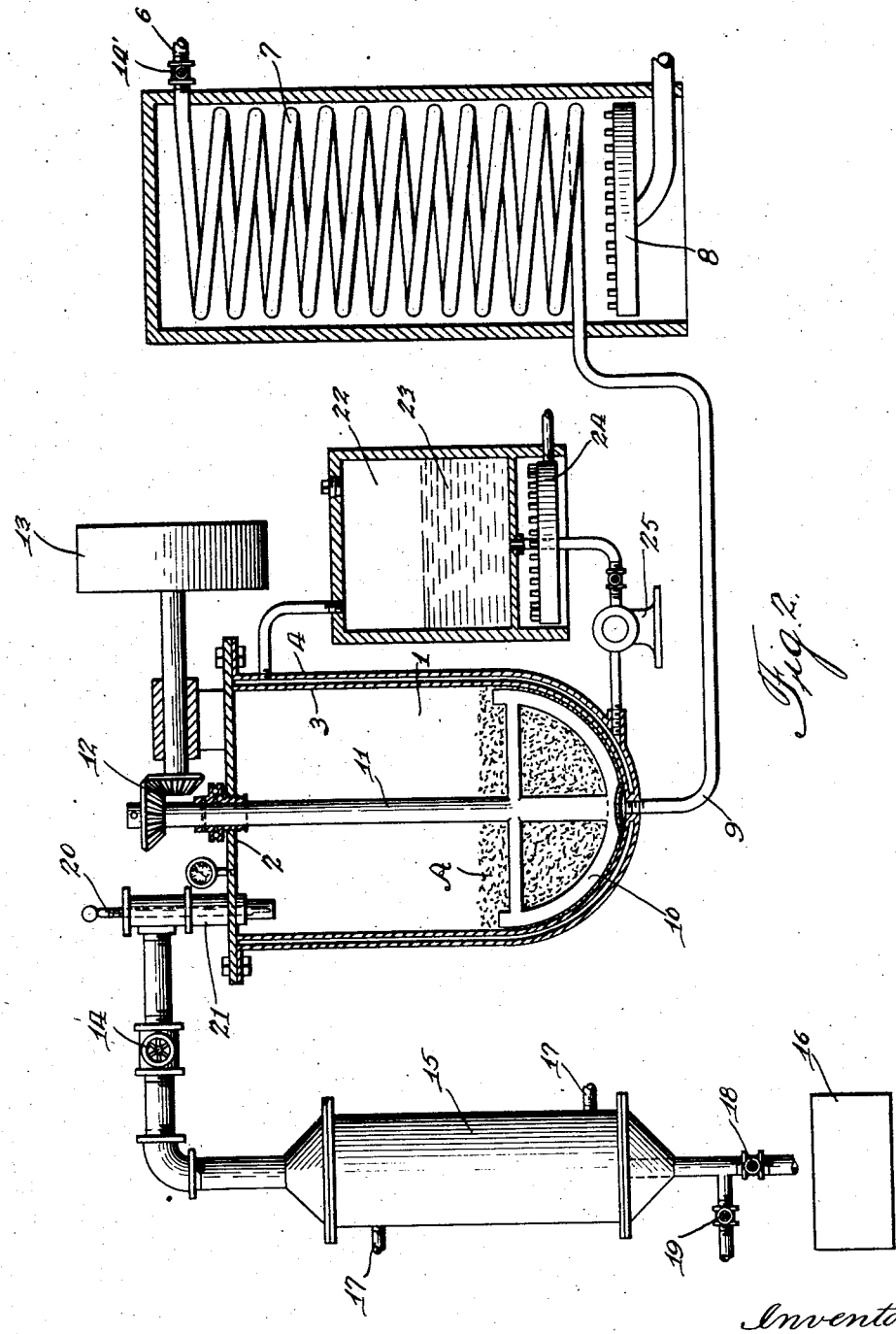

Patented Dec. 20, 1938

2,140,572

UNITED STATES PATENT OFFICE 2,140,572

PROCESS FOR PRODUCING FURFURAL

Harold J. Brownlee, Cedar Rapids, Iowa, assignor to The Quaker Oats Company, Chicago, Ill., a corporation of New Jersey Application June 24, 1936, Serial No. 87,000

6 Claims. (Cl. 260—347)

My invention relates to improvements in processes for manufacturing furfural, and relates particularly to a process for the production of furfural in substantial quantities by heating hydrolyzed furfural-yielding material in a current of dry steam or other moisture-absorbent gas whereby the concentration of the furfural-forming catalyst is continuously increased by reason of the progressive removal of the liquid, which is usually water, from the reaction mass.

Another object of my invention is to provide a process wherein the time required for the conversion of furfural-yielding materials to furfural is substantially reduced.

A further object of my invention is to provide an improved process for the production of furfural from plant materials wherein the furfural-free residue that remains is in a substantially dry form thereby making the residue more suitable for fuel.

A further object of my invention is to produce furfural in a highly concentrated initial solution from which the furfural can be readily recovered, since furfural can be more economically separated from a rich mixture than from a lean one.

Other objects of my invention will be apparent from the following description and accompanying drawings, wherein Figure 1 is a schematic diagram of one form of apparatus whereby my invention may be practiced; and Fig. 2 is another schematic diagram showing apparatus for practicing the process of my invention.

Heretofore in the manufacture of furfural, it has been customary to process pentosan-containing material by heating with steam the dampened or aqueous mass in the presence of a suitable catalyst or acid, and to remove the furfural as formed by boiling or by distilling with steam. Substantial yields of furfural have been obtained by these methods, but these former processes are time consuming, and, moreover, the furfural-yielding material that may be processed per machine per unit time is correspondingly small. It is an object of my invention to divide the furfural process into two distinct phases or steps, in the first of which conditions are optimal for hydrolysis of pentosan to pentose, and in the second of which conditions are optimal for dehydration of pentose to form furfural.

I have discovered that furfural can be produced from a given quantity of furfural-yielding material in unexpectedly large quantities and within an unexpectedly shorter reaction time than with the previous processes by hydrolyzing the furfural-yielding material in the presence of catalysts, followed by heating the hydrolyzed material in a current of moisture-absorbent gas for the removal of substantial quantities of added water, the water formed during the reaction and the furfural. In the formation of 96 pounds (1 mol.) of furfural from pentose, there is liberated during the reaction 54 pounds (3 mols.) of water.

In prior art processes, additional increments of water usually were added to the reaction mass through the use of moist steam, as well as through condensation of water on the walls of imperfectly insulated vessels. Therefore, as these processes were operated there was no reduction of the water content of the mass during the furfural-forming reaction, and frequently there was a higher content of water present in the residue at the end of the operation than at its beginning. Under the prior methods of manufacture, where this water of reaction was not removed it diluted the furfural-forming catalyst and thereby decreased the reaction velocity.

In the second step of my process, as the total quantity of water in the reaction mass progressively decreases, the concentration of the catalyst in this reaction mass increases toward the end of the reaction, with the result that the reaction velocity is increased and the time required for the reaction to come to completion is therefore unexpectedly shortened. In accordance with my invention, I raise the temperature of the reaction mass toward the end of the reaction and further shorten the reaction time by this means. Also, in accordance with my invention, I remove substantial amounts of water during the furfural-forming reaction and raise the temperature of the reaction as the reaction proceeds. Also, in accordance with my invention, I may sometimes increase the catalyst concentration by the addition of a furfural-forming catalyst to the reaction mass after the hydrolysis is substantially complete. However, it is more convenient to increase the catalyst concentration by removal of the water rather than by adding more catalytic material. Inert gases other than steam may be used, such as carbon dioxide, nitrogen, hydrogen, low molecular weight hydrocarbons, etc., but steam is generally preferable because of the relatively high specific heat of steam, its cheapness, and because of the ease of completely separating furfural from it. The moisture-absorbent steam or gas acts as a carrier of furfural and water from the reaction mixture, and of heat to the reacting material, and may be heated to any desired temperature before it is introduced into the reaction chamber. It may be preferable, however, to obtain a portion of the heat required for removing the water and furfural from the reaction mass by the use of steam, hot oil, or the like in the jacket of the digester, or by other suitable means. From the hot reaction mass in the chamber the steam may be led to a condenser, or the furfural may be recovered by any suitable means from this carrier. It is to be understood that the method of recovery of the furfural from the carrier is dependent upon the nature of the carrier employed. But any one skilled in the art would be conversant with the proper method to employ when an inert non-condensable gas is employed as the carrier of the furfural and the water from the reaction mass.

A survey of the processes employed in the manufacture of furfural will serve to emphasize the revolutionary improvements inherent in the process of my invention. The work of many previous investigators employing naturally occurring raw materials has shown that a large pentosan content (xylan or araban) is favorable to greater yields of furfural. The exact chemical constitution of the pentosans is not known, and indeed they probably vary considerably, but they all have one property in common—namely, that upon hydrolysis they are converted into pentose material having the empirical formula that may be expressed as $C_5H_{10}O_5$. In all methods in use for the manufacture of furfural this preliminary step of hydrolysis is employed.

As indicated above, the hydrolytic step has in the prior art been followed by the decomposition of the pentose material to furfural in the presence of varying amounts of water and/or steam. This reaction occurs presumably according to the following equation:

$$C_5H_{10}O_5 = C_5H_4O_2 + 3H_2O$$
pentose    furfural + water

In all of these processes the furfural has been formed in the presence of much larger quantities of water than is used in my new process, since no deliberate effort has been made to maintain dehydrating conditions during this step in the process. It seems strange that in all methods previously employed for producing furfural, this second step—which is a dehydration reaction—has always been carried out under conditions where excess water is present. In my newly invented process, water is used during the hydrolysis of the pentosan when its presence is essential, but it is continuously and progressively removed during the second step when furfural is being formed and removed. Under these dehydrating conditions, the dehydration of the pentose material with consequent formation of furfural takes place efficiently in a much shorter time than when the water is not progressively decreased during the reaction. In fact, under certain dehydrating conditions, the dehydration of the pentose material takes place in a few minutes with very gratifying yields of furfural, and the resultant condensed vapors are richer in furfural than those obtained by previous methods. At the low concentrations of the acid catalyst normally employed, the formation of furfural from pentose or hydrolyzed pentosan does not occur with appreciable velocity until a temperature substantially higher than 100° C. is reached, and this makes it possible to evaporate substantial quantities of the excess water from the reaction mixture before substantial quantities of furfural are formed. It is obvious, therefore, that when the hydrolysis has been completed, excess water may be removed in any desired manner—that is, by air drying, vacuum distillation, by washing with solvents, or merely by heating—and if the excess water is substantially removed before the reaction mixture reaches the temperature at which furfural is formed, the furfural will be obtained in high concentration during the subsequent dehydration reaction.

In my many preliminary experiments on pentose-containing materials, the pentose material was quickly dehydrated, and when steps were taken to remove the products of decomposition from the reaction mixture, good yields of furfural were obtained. For example, finely powdered acidified xylose was sprayed onto hot metal in a current of dry inert gas. It quickly decomposed into furfural and water, and almost quantitative yields were obtained.

Starting with pentosan-containing materials, and operating under suitable conditions, my newly invented process has certain distinct advantages. First, the time required for the reaction to be completed is very much shortened, the conversion of the pentose material into furfural taking place in less than 60 minutes, whereas the cooking time by previous methods usually required from two to six hours. Second, the furfural concentration of the distillate is much greater; also, the yields are high. Using oat hulls in my new process, yields of furfural as high as 16% of the air dry weight of the oat hulls have been obtained.

Any furfural-yielding plant material may be used in my new process, but those containing substantial quantities of furfural-yielding substances are to be preferred, such as corncobs, cornstalks, bagasse, cottonseed hulls, cottonseed bran, oat hulls, rice hulls, peanut hulls, wheat and oat straw, wheat chaff, barley hulls, weed stems, tree leaves, wood, and material of this character.

Since furfural is decomposed in the presence of strong acids at the elevated temperatures employed in making furfural, it is desirable, if the acid has not previously been neutralized, to remove the furfural from the reaction zone substantially as quickly as formed. I have found that dry or superheated steam is suitable for this purpose, and when this is properly used the furfural concentration in the reaction mass can be kept so low that losses from decomposition of the furfural are relatively small. A carrier is especially desirable at the high temperatures developed when pressure at or above atmospheric are employed, but at pressures substantially below atmospheric the quantity of carrier can be reduced materially and, under certain conditions, a carrier supplied externally of the reaction mixture can be eliminated since the water evaporating from the reaction mixture may be utilized as a carrier.

In practicing my invention, the raw material is preferably moderately wetted with dilute acid or acid-reacting salts or other hydrolyzing catalysts and heated with or without pressure until substantial hydrolysis of pentosan to pentose has taken place. It is to be understood that while during this step of the process the major reaction taking place is the transformation of pentosan to pentose, there will simultaneously occur a minor reaction in which small quantities of furfural will be formed. As examples of catalysts which have been used are: sulfuric acid, phosphoric acid, hydrochloric acid, sodium acid sulfate, aluminum chloride, zinc chloride, ferric chloride, and various combinations of these and other similar products. In fact, any compound which is an effective catalyst for the conversion of pentosan to a pentose may be used. Upon the completion of the hydrolysis reaction, the catalyst may, if desired, be increased or decreased by any method which does not remove the pentose. The pentose-containing material is then heated at, about, or below atmospheric pressure until substantially anhydrous, and generally a carrier in the form of a current of superheated steam or other moisture-absorbent gas is simultaneously passed through the material until the dehydration reaction is complete, although when operating below atmospheric pressure an external carrier may not be necessary, as explained above. It should be understood that while during this second step of the process the major reaction taking place is the transformation of pentose to furfural, there may simultaneously occur a minor reaction in which still unconverted pentosan will be transformed to pentose.

The important features of my new process which differentiate it sharply from processes previously known or used for the production of furfural will be clear from an explanation of the chemical reactions involved (briefly discussed above) in their specific relation to my improved process. The first reaction consists in transforming pentosan into pentose and is a hydrolysis reaction—that is, it requires the presence of water. In my process this reaction is carried out in the presence of a sufficient but not excessive amount of water. I have found that a moderate wetting of the reaction mixture is sufficient to permit rapid completion of this hydrolysis of pentosan to pentose, and that the presence of excessive amounts of water is disadvantageous both economically and chemically in the second step of the process. This first step of the process is conducted under such reaction conditions of temperature, pressure, time, and composition of reaction mixtures that the principal change which takes place is the transformation of pentosan to pentose, and that only small quantities, relative to the theoretical maxima, of furfural are produced.

When the pentosan content of the reaction mixture has been transformed substantially to pentose, I modify my reaction conditions so as to render them primarily favorable to the second chemical reaction—that is, the transformation of pentose to furfural. I do this, however, without attempting to separate the pentose content from the other components of the reaction mixture. I may, therefore, continue the process in the original reaction vessel or may transfer the whole reaction mass to another type of apparatus more suitable for the second or furfural-forming step of the reaction. The reaction by which furfural is formed from pentose involves the dehydration of the pentose molecule, yet so far as I am aware no effort has ever been made in any process of furfural manufacture known heretofore to produce rapid dehydration of the reaction mass during this part of the process. I have now discovered, however, that by providing conditions tending to produce rapid dehydration of the reaction mass during the furfural-producing step, I can shorten the reaction period and improve the yield of furfural in addition to providing important economic advantages.

In carrying out the second step of my process, I may initially—that is, at the end of the first or pentose-producing step—modify the nature of my reaction mixture to produce therein conditions more favorable to the second or furfural-producing step of my process. I may, for example, change the catalyst content either qualitatively or quantitatively, as by partially or completely neutralizing the catalyst originally present and substituting for it other catalytic material better suited to the furfural-forming reaction. I may at this point add partially converted residues from previous batches containing both furfural and furfural-yielding components, or I may also remove some of the water present, as by heating in vacuum at low temperatures, so as to produce only minimal quantities of furfural. Usually, however, I find it satisfactory to proceed by merely changing the physical reaction conditions by increasing the heat input, as by introducing superheated steam or other hot moisture-absorbing gas and bringing this superheated steam quickly into contact with all parts of the reaction mixture, so that dehydrating conditions and removal of formed furfural may be produced as rapidly as possible. The superheated steam or hot inert gas is removed substantially as rapidly as introduced, since it serves the two purposes of producing dehydrating conditions favorable to the furfural-forming reaction and acting as a carrier for the quick removal of the furfural as soon as it is formed inasmuch as this is highly desirable in order to prevent the decomposition of furfural which rapidly occurs under the conditions favorable to its formation. The source of heat may be limited to the hot gas introduced, or this effect may be augmented by the use of steam-jacketed equipment, direct firing, or the like.

By operating under these conditions, I have found it possible to obtain increased yields of furfural and to carry out the entire process of furfural manufacture in much shorter time than has heretofore been possible, thus providing substantial economies in the way of increased capacity of equipment and consequent reduction in cost of labor, repairs, etc.

The process may be carried out as a batch or as a continuous process. In the latter the superheated steam or dry carrier-gas is passed counter to the flow of the material. Heat may be supplied to the material solely by the carrier or may be augmented from other sources, such as a steam jacket. As described above, the process may be carried out in a single piece of equipment or in two different pieces of apparatus. In the two-machine process, I prefer to hydrolyze by heating the material in a closed digester, then remove said material after hydrolysis, and then subject it to heat and a counter-flow of superheated steam in one of the usual continuous dry distillation units either at, above, or below atmospheric pressure.

In a one-machine process, I prefer to hydrolyze in a closed rotary-jacketed digester and then immediately subject the hydrolyzed mass to vigorous heating, both by superheated steam directly contacting the hydrolyzed mass and by circulating hot liquids or gases through the jacket of the digester, or by direct firing of the digester and progressively drying the mass in this manner until the furfural is formed and removed or until incipient carbonization of the residue sets in. Any conventional method of applying heat to raise the hydrolyzed mass to the desired temperature may be used.

Another method of operating my process is similar to the method disclosed in my United States Patent No. 1,919,878, of July 25, 1933, except that steam with much superheat is employed which progressively dehydrates the reaction mass even to incipient carbonization in its travel through the digester.

For a better understanding of the nature, scope, and characteristic features of my invention, reference may now be had to the accompanying drawings, in which Fig. 1 shows one form of apparatus by means of which my invention may be practiced, and Fig. 2 shows another form of apparatus for practicing my invention whereby the jacket of the cooker may be supplied with hot liquid while the reaction mixture is being distilled.

Referring to Fig. 1, the charge A comprising the oat hulls or other pentosan-containing material from which furfural is to be obtained in place in a cooker or a stationary kettle 1 having a removable lid 2. The kettle is steam-jacketed and possesses an inner shell 3 and an outer shell 4. Steam is admitted and withdrawn from the jacket so formed through pipes 5. After the charge A has been placed in the cooker and the lid 2 firmly secured, live saturated steam is admitted through the pipe 6 to a heating coil 7 which is heated by a gas burner 8. In this fashion the steam flowing through the coil 7 is superheated and, consequently, dried.

This superheated dried steam is admitted into the cooker through the pipe 9 where it is intimately intermixed with the charge A which during treatment is stirred by a stirrer 10. The latter is mounted on a shaft 11 that, in turn, is rotated by the bevel gear train 12 to which power is supplied by a belt and pulley indicated at 13. The rate of supply of steam to the cooker and the charge A is controlled by valves 14 and 14'.

During distillation the steam is preferably maintained at a pressure of substantially 60 pounds in the cooker. The vapors containing the furfural are led to a water-cooled condenser 15 and collected in a tank 16. Water is circulated through the condenser 15 by means of pipes 17. By means of valves 18 and 19 the condensate from the cooker 1 may be run directly to the tank 16 or to any suitable distillation unit not shown. The distillation from the cooker 1 is stopped when the thermometer 20 in the mercury well 21 records a temperature of approximately 200° C.

I have not described the method of recovering the furfural from the condensed vapors that are collected in the tank 16, inasmuch as this can be accomplished by many devices well known in the art.

The apparatus shown in Fig. 2 is substantially the same as that illustrated in Fig. 1, except that in Fig. 2 a tank 22 is employed for heating a body of liquid 23 to any desired temperature by means of a burner 24. The hot liquid 24 is circulated through the jacket of the cooker by means of a pump 25. This body of liquid can be heated to any desired temperature and is continuously circulated through the jacket of the cooker while the reaction charge A is being distilled therein.

As an exemplification of my process, I may place a charge of oat hulls or other pentosan-containing material weighing approximately 5,000 pounds into the cooker. To this is added 4,000 pounds of water containing 200 pounds of concentrated sulfuric acid (66° Bé.). This mixture of oat hulls, acid catalyst, and water is then heated, while the cooker is closed, by heating the walls thereof through the steam jacket and by admitting steam directly into the cooker until a gauge pressure of 60 pounds per square inch is reached, or until hydrolysis of the reaction mass is well advanced.

Superheated steam at a temperature of 200 to 400° C., or above, is then admitted into the cooker, preferably at the bottom, as shown, so that it will thoroughly permeate the mass of hydrolyzed material A which is constantly stirred by rotation of the stirrer. On leaving the cooker through the valve 14, the steam and vapors carrying the furfural and the water absorbed from the reaction mixture, besides the water of reaction, are led to the condenser 15 or any suitable continuous fractionating column. In either case the furfural is recovered by conventional methods.

During the time that the superheated steam is being passed through the reaction mass A, it is advantageous to apply heat externally to the cooker so that the reaction mass is rapidly raised to a high temperature. This may be accomplished by admitting steam through the pipes 5 into the jacket of the cooker. This additional heat is preferably applied to the cooker at such a rate that the steam leaving the cooker will reach a temperature of about 200° C. in 60 minutes. The heating of the cooker may be continued to the point where carbonization of the residue has commenced, at which time the furfural-forming reaction is substantially complete or the dehydration of the pentoses is substantially complete. The yield of furfural procured from oat hulls of the quantity above described and under the conditions specified will be approximately 800 pounds. I have also been able to secure good results by employing saturated steam as the carrier for the furfural and maintaining the dehydrating conditions in the reaction mass by keeping the temperatures on the jacket of the cooker substantially greater than the temperatures obtaining in the reaction mass within the digester. This may be accomplished, of course, in many well known ways, as any one skilled in the art will perceive.

In the exemplification of my invention given above, definite values have been assigned to the variable functions, such as the amounts of water and acid, the pressure, the temperature, the time, etc. These values represent a preferred embodiment of my invention but by no means are to be considered as limiting values. For example, I have obtained good yields of furfural with a steam pressure of 15 pounds per square inch absolute and with a ratio of three parts water to one of solids. Pressures less than atmospheric can also be used. Great variations have been made in the temperature of the superheated steam employed, and in every case substantial yields of furfural have been obtained. Also, the hydrolyzed material may be partially neutralized before being subjected to the action of the superheated gas. The use of a current of steam may be dispensed with, and all the heat applied to the reaction mass may be transmitted through the walls of the cooker. This is particularly true when the heating is carried out below atmospheric pressure.

It may here be stated that the first part of the distillate coming from the heated mass will contain a relatively small amount of furfural. This distillate may be discarded or saved for applying to a new charge. It is advisable that only the portion of the distillate which contains substantial quantities of furfural be put through the refining process.

While I have described my invention in detail, it is to be understood that many modifications may be made therein without departing from the spirit and scope of the appended claims. Also, it is to be understood that my process is not to be confined to the specific form of apparatus shown, but may be practiced by many other types of apparatus even where the process is a continuous one rather than a batch process such as I have specifically described herein.

Having thus described my invention, what I claim and desire to secure by Letters Patent is:

1. A process for the manufacture of furfural which comprises treating a mixture of pentose-yielding material, water, and an acid catalyst by subjecting it to heat and pressure sufficient to hydrolyze the material while maintaining the water content thereof substantially undiminished, then subjecting the reaction mass to additional heat and the continuous flow therethrough of a moisture-absorbing gas with a sufficiently high heat-content to rapidly remove the furfural as formed and simultaneously to dry the reaction mass.

2. A process for the manufacture of furfural which comprises treating a mixture of pentose-yielding material, water, and an acid catalyst by subjecting it to heat and pressure sufficient to hydrolyze the material while maintaining the water content thereof substantially undiminished, then subjecting the reaction mass to additional heat and the continuous flow therethrough of super-heated steam with a sufficiently high heat-content to rapidly remove the furfural as formed and simultaneously to dry the reaction mass.

3. A process for the manufacture of furfural which comprises treating a mixture of oat hulls dampened with water and dilute sulphuric acid by subjecting it to heat and pressure while maintaining the water content thereof substantially constant, the reaction conditions of time, heat, and pressure being so controlled as to minimize the formation of furfural, and then after hydrolysis of the reaction mass is substantially completed subjecting the reaction mass to a current of super-heated steam in sufficient amount to remove the furfural as formed and to simultaneously dry the reaction mass.

4. A process for the manufacture of furfural which comprises hydrolyzing pentosan-containing material in the presence of water, an acidic catalyst, and steam having a gauge pressure not in excess of 60 pounds per square inch, then drying the ensuing reaction mass by subjecting it to the flow therethrough of a moisture-absorbent gas and simultaneously increasing the temperature of the reaction mass to substantially 200° C. and continuing to withdraw such gas until substantially all of the water and subsequently all of the furfural have been removed.

5. A process for the manufacture of furfural which comprises hydrolyzing pentosan-containing material in the presence of water, an acidic catalyst, and steam having a gauge pressure not in excess of 60 pounds per square inch, then progressively increasing the temperature of said mass and removing water and the furfural formed by passing sufficient super-heated steam therethrough so that at the end of the furfural-forming reaction the liquid content of the reaction mass is substantially zero.

6. A process for the manufacture of furfural which comprises hydrolyzing furfural-yielding material in the presence of water and an acidic catalyst while subjecting the same to a temperature not in excess of that corresponding to 60 pounds gauge pressure, the liquid-solid ratio of the reaction mass being approximately 8 to 10 at the start of the reaction, then progressively increasing the temperature of the reaction mass while subjecting the same to the flow of a moisture-absorbent gas until at the end of the furfural-forming reaction the liquid content of the said mass is substantially zero and withdrawing, simultaneously with the said increasing of the temperature, the water and furfural from the reaction mass by the flow of said moisture-absorbent gas.

HAROLD J. BROWNLEE.